United States Patent

Wehler et al.

[11] Patent Number: 5,201,885
[45] Date of Patent: Apr. 13, 1993

[54] GUIDE CHAIN FOR GUIDING ENERGY LINES

[75] Inventors: Herbert Wehler, Neunkirchen; Paul-Werner Mack, Wenden; Willibald Weber, Netphen, all of Fed. Rep. of Germany

[73] Assignee: Kabelschlepp GmbH, Siegen, Fed. Rep. of Germany

[21] Appl. No.: 839,580

[22] Filed: Feb. 21, 1992

[30] Foreign Application Priority Data

Feb. 22, 1991 [DE] Fed. Rep. of Germany ....... 4105652

[51] Int. Cl.$^5$ .............................................. F16G 13/16
[52] U.S. Cl. ..................................... 59/78.1; 59/900; 248/49
[58] Field of Search ............... 59/78, 78.1, 900; 248/48, 50, 51, 70

[56] References Cited

U.S. PATENT DOCUMENTS

| 3,848,407 | 11/1974 | Moritz ................... | 59/78.1 |
| 4,833,876 | 5/1989 | Kitao et al. ............. | 59/78.1 |
| 5,014,506 | 5/1991 | Moritz ................... | 59/78.1 |
| 5,108,350 | 4/1992 | Szpakowski ............. | 59/78.1 |

FOREIGN PATENT DOCUMENTS

| 0161417 | 11/1985 | European Pat. Off. . |
| 0286442 | 12/1988 | European Pat. Off. . |
| 2255283 | 5/1974 | Fed. Rep. of Germany . |
| 3408912 | 8/1985 | Fed. Rep. of Germany . |
| 8513491 | 8/1985 | Fed. Rep. of Germany ....... 59/78.1 |
| 3516448 | 9/1986 | Fed. Rep. of Germany . |
| 3431531 | 2/1989 | Fed. Rep. of Germany . |
| 8910217 | 8/1989 | Fed. Rep. of Germany . |
| 9014027 | 9/1990 | Fed. Rep. of Germany . |
| 9102121 | 6/1991 | Fed. Rep. of Germany . |
| 9102122 | 6/1991 | Fed. Rep. of Germany . |

Primary Examiner—David Jones
Attorney, Agent, or Firm—Robert W. Becker & Associates

[57] ABSTRACT

A guide chain for guiding energy lines form a stationary connection to a movable consuming device is comprised of a plurality of chain members being pivotably connected with one another. Each one of the chain members is comprised of two side portions arranged at a distance parallel to one another and two transverse elements that are connecting the two side portions. Separating cross-pieces which divide the energy line channel may be arranged within the energy line channel in a slidable or fixedly connected manner because the transverse elements are provided with a respective longitudinal groove. A plurality of bores extends from the bottom of the groove through the transverse elements and each separating cross-piece is provided at its upper and lower end with a holder comprising at least one pin, the length of which corresponds to the depth of the groove.

4 Claims, 2 Drawing Sheets

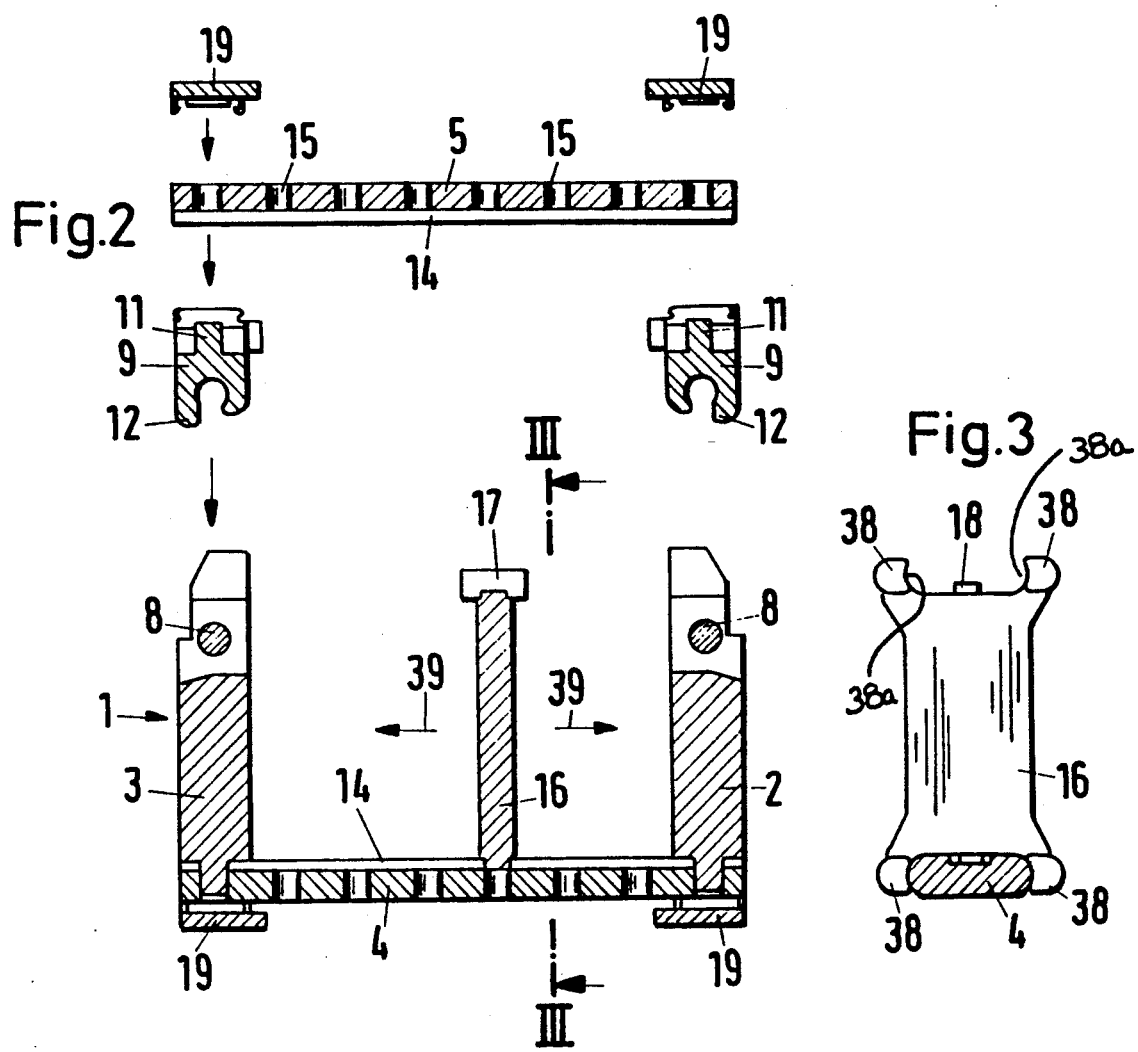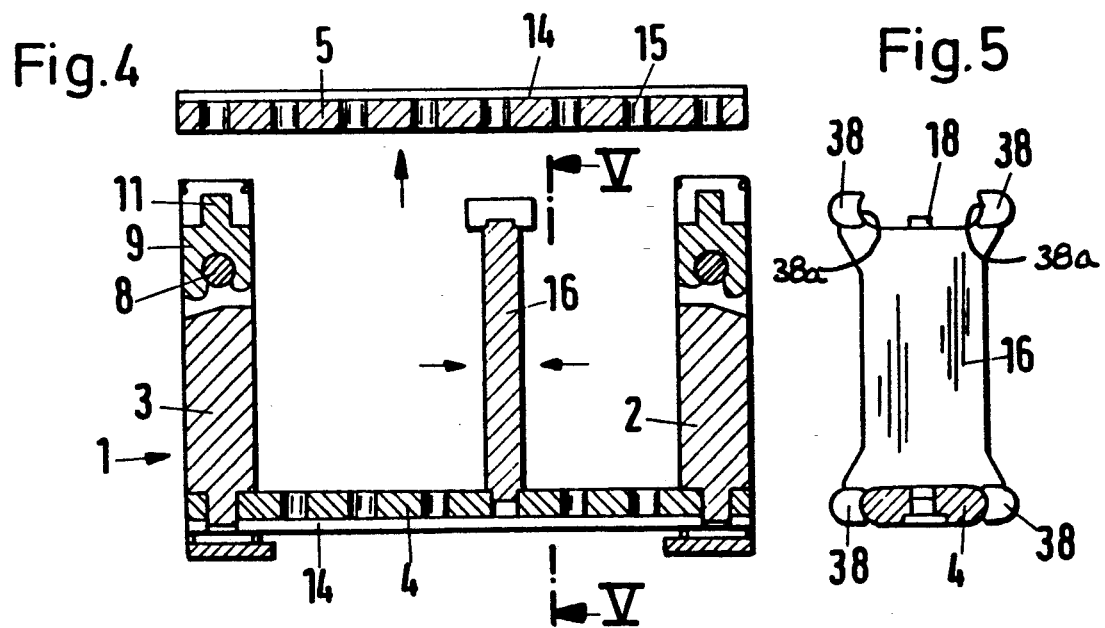

GUIDE CHAIN FOR GUIDING ENERGY LINES

BACKGROUND OF THE INVENTION

The present invention relates to a guide chain for guiding energy lines, especially electric cable or hoses, from a stationary connection to a movable consuming device whereby the guide chain is comprised of a plurality of chain members that are pivotably connected with one another. Each chain member is comprised of two side portions arranged at a distance parallel to one another and two transverse elements connecting the two side portions.

Guide chains of the aforementioned type are known. For example, such a guide chain is disclosed in the German utility model 89 10 217 in which a dividable cross-piece for the energy line channel is provided. The cross-piece is made of at least two transverse elements with separating cross-pieces being arranged between the transverse elements perpendicular to their extension and with cross-members extending parallel to the transverse elements between the separating cross-pieces. This known guide chain is especially suitable for guiding energy lines in different channels that are separated from one another within the main energy line channel. However, the separating cross-pieces dividing the channel in the longitudinal direction of the transverse elements may not be moved so that an adaptation of the distances between the cross-pieces is only possible when the guide chain is partly disassembled.

It is therefore an object of the present invention to provide a guide chain in which the energy line channel is dividable by separating cross-pieces which, in a simple manner, may be slidably or fixedly arranged within the energy line channel.

BRIEF DESCRIPTION OF THE DRAWINGS

This object, and other objects and advantages of the present invention, will appear more clearly from the following specification in conjunction with the accompanying drawings, in which:

FIG. 2 shows an exploded view of the chain member according to FIG. 1 with separating cross-pieces that are slidable in the longitudinal direction of the transverse elements in a cross-sectional view along the line II—II;

FIG. 3 shows a separating cross-piece according to FIG. 2 in a side view along the line III—III;

FIG. 4 shows a chain member according to FIGS. 1 and 2 with separating cross-pieces that are fixedly connected in the longitudinal direction of the transverse elements in a cross-sectional side view; and FIG. 5 shows the separating cross-piece inserted into the chain member according to FIG. 4 in a side view along the line V—V.

SUMMARY OF THE INVENTION

Figure 1:
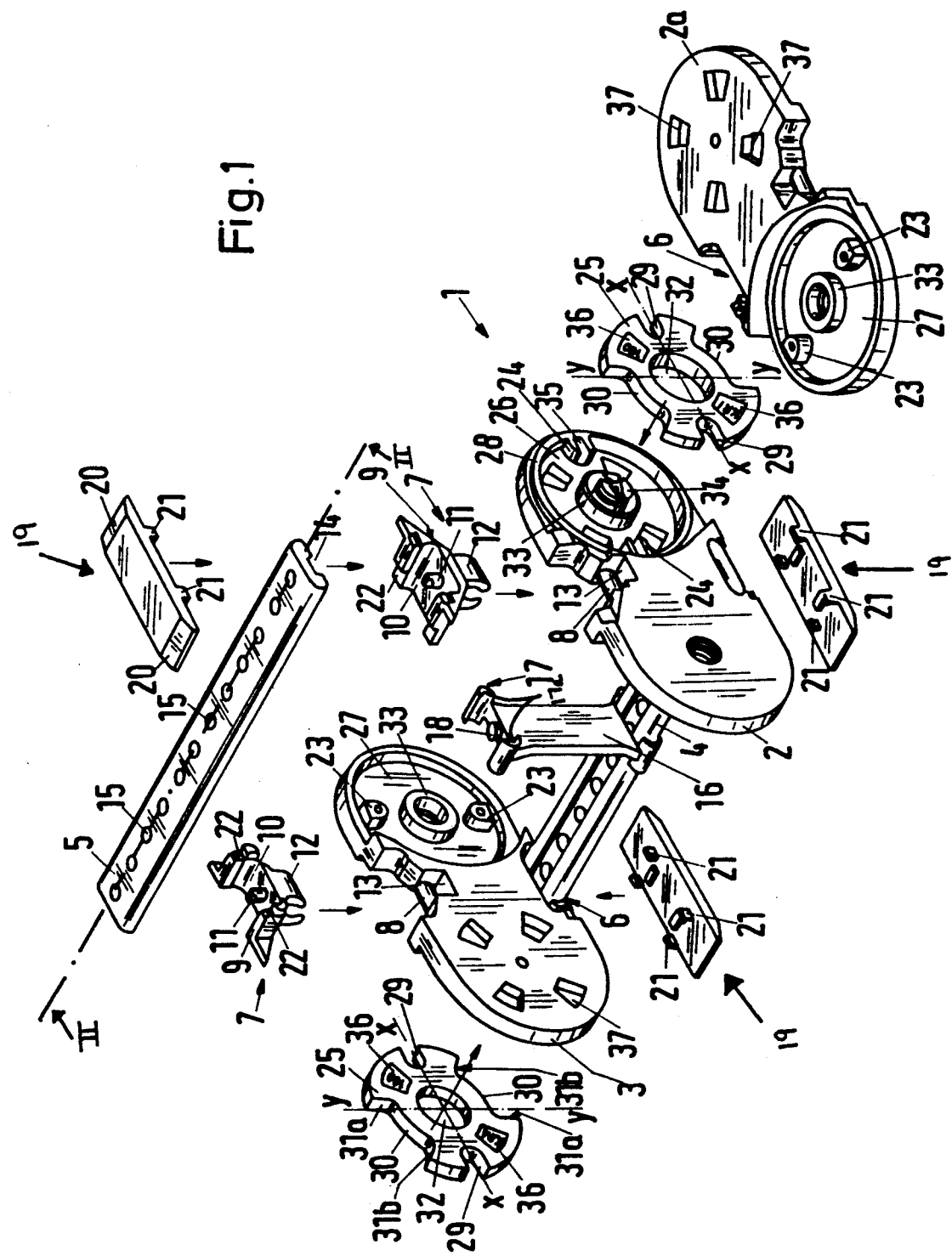
FIG. 1 shows a chain member of the guide chain in an exploded perspective view.

The guide chain of the present invention is primarily characterized by a plurality of chain members being pivotably connected with one another, each of the chain members being comprised of: Two side portions arranged at a distance parallel to one another; two transverse elements connecting the side portions with one another, each one of the transverse elements having a longitudinal groove and a plurality of bores extending from a bottom of the groove through the transverse element: and at least one separating cross-piece arranged between the transverse elements, the separating cross-piece, at ends thereof facing the transverse elements, having a holder with at least one pin of a length corresponding to a depth of the groove.

A guide chain according to the present invention has the advantage that the transverse element may be mounted in a simple manner between the side portions such that, on the one hand, the groove which is provided in the transverse element may be facing the energy line channel or may be facing in an outward direction. In the first instance, the separating cross-pieces are connected to the transverse elements only with their holders provided at their upper and lower ends. Since the pins provided within the holders have only a length that corresponds to the depth of the groove, the separating cross-pieces are thus slidable in the longitudinal direction of the transverse elements. However, when the transverse elements are turned 180° so that the groove is oriented in the outward direction the pins engage the corresponding bores in the transverse elements so that the separating cross-pieces are now fixedly connected in an axial direction of the transverse elements. Accordingly, the inventive guide chain provides a plurality of applications.

It is preferable that the transverse elements have a flattened cross-section over their entire length. The holder is expediently U-shaped and has cutouts for receiving the transverse elements. Advantageously, the U-shaped holder has two legs that are elastically deformable transverse to a longitudinal direction of the transverse elements, and the pin is arranged at a same distance relative to the legs at the bottom of the U-shaped holder.

In a preferred embodiment of the present invention, the transverse elements have a flattened cross-section over their entire length and are insertable in a frictional and form-locking manner into the corresponding holding members of the side portions The embodiment of the transverse elements with a flattened cross-section has the advantage that the transverse elements may be manufactured in a simple manner and then cut to length according to the desired dimensions, or may be manufactured to the desired length. Furthermore, the flattened embodiment of the transverse elements yields chain members of a flat construction having an energy line channel of a maximum size.

The holder of the separating cross-piece, in a further embodiment, is U-shaped and provided with undercuts into which the transverse elements are insertable. In this embodiment, the transverse elements may be connected in a simple manner to the holders of the separating cross-pieces so that the transverse elements, even under great loads, will not be accidentally released from the chain members. In the present invention, the attachment of the transverse elements to the separating cross-pieces and to the side portions is achieved without screws or other fastening means.

Furthermore, it is suggested that the holder is provided with two legs which are elastically deformable in a direction transverse to the longitudinal direction of the transverse element and that the pin provided at the cross-piece is arranged at a same distance from both legs. The elastic legs provide for an easy insertion and removal of the transverse elements into, respectively, from the holder of the cross-pieces. Furthermore the elastic legs provide a secure fastening of the inserted transverse elements. The identical distance of the pin with respect to the legs of the cross-piece allows the mounting of the transverse elements without any regard to its orientation. Accordingly, the guide chain may also be manufactured in an automated process

DESCRIPTION OF PREFERRED EMBODIMENTS

The present invention will now be described in detail with the aid of several specific embodiments utilizing FIGS. 1 through 5.

A chain member 1 is comprised of two side portions 2 and 3 which are arranged at a distance parallel to one another and which are connected to one another by transverse elements 4 and 5, thus enclosing an energy line channel. The transverse element 4, over its entire length, has a flattened cross-section with rounded narrow sides and may be inserted into cutouts 6, provided with undercuts, of the narrow sides of the side portions 2 and 3, whereby the transverse element 4 is connected in a frictional and form-locking manner to the cutouts 6 of the side portions 2 and 3 by performing a rotating insertion about its longitudinal axis. The transverse element 5 is also provided with a flattened cross-section over its entire length and with rounded narrow sides. It may be mounted in a pivotable manner on respective pivot joints 7 provided at the narrow sides of the side portions 2 and 3.

The pivot joints 7 are comprised of a lug element 8 arranged within the side portions 2, 3 and a holding member 9 which is pivotably clamped onto the lug element 8 the holding member 9 having an essentially U-shaped cutout 10. The cutout 10, in which the transverse element 5 is mounted in a frictional and form-locking manner by a rotational insertion about its longitudinal axis and connected to the holding member 9 is provided with a pin 11. The holding member 9 is further provided with a spring clip 12 at its underside with which the holding member 9 is clamped onto the lug element 8. The lug element 8 is arranged in a cutout 13 of the side portion 2, 3 and extends in a longitudinal direction of the side portions 2, 3.

The transverse elements 4 and 5 both have a flattened cross-section with rounded narrow sides over their entire length. One of the flat sides of the transverse elements 4 and 5 is provided with a groove 14 extending in the longitudinal direction of the transverse elements 4, 5. Furthermore, the transverse elements 4, 5 are provided with a plurality of bores 15. The pins 11 engage the two outwardly positioned bores 15 of the transverse element 5 upon insertion into the holding member 9 so that the transverse element 5 is fixedly connected in a transverse direction relative to the longitudinal extension of the chain member 1. The transverse elements 4 and 5 may be connected to the side portions 2 and 3 such that the groove 14 is inwardly or outwardly oriented.

Between the transverse elements 4, 5, a separating cross-piece 16 is provided which has U-shaped holders 17 with undercuts 17a at its upper and lower ends. Pins 18 for engagement with the bores 15 of the transverse elements 4 5 are connected to the holders 17. The length of the pins 18 corresponds to the depth of the groove 14. In this manner, the separating cross-piece 16 is slidable in the longitudinal direction of the transverse elements 4, 5 when the transverse elements 4, 5 are attached to the side portions 2, 3 with the groove 14 facing inwardly. When the grooves 14 of the transverse element 4, 5 are outwardly oriented, the pins 18 of the separating cross-piece 16 engage the bores 15 of the transverse elements 4, 5 so that the separating cross-piece 16 is no longer slidable in the longitudinal direction of the transverse elements 4, 5. Of course, it is also possible to provide a plurality of separating cross-pieces 16 between the transverse elements 4, 5 of one chain member 1.

At the upper and lower narrow sides of the side portions 2, 3 gliders 19 are detachably mounted which may glide one on the other when the guide chain is bent and the upper portion of the guide chain is supported on the lower portion of the guide chain. The length of the gliders 19 is determined such that the distance between neighboring side portions 2, 2a is bridged. The gliders 19 are directly attached to the lower narrow sides of the side portions 2, 3 and indirectly connected to the upper narrow sides of the side portions 2, 3, that is, via the holding member 9 of the pivot joint 7.

Each glider 19 is plate-shaped, and the surface facing away from the narrow sides of the side portions 2, 3 is provided with two slanted portions 20 oriented in the longitudinal direction of the glider 19. At the underside of the glider 19 four catch elements 21 are provided which are insertable into respective cutouts 22 at the side portions 2, 3, respectively, at the holding member 9.

The relative pivot angle of neighboring chain members 1 is determined by stops 23, 24 and a stop insert 25. The stops 24 of the side portion 2 are arranged within a recessed portion 26 of the side portion 2 and are positioned along the longitudinal axis of the side portion 2. The stops 23 at one end of the side portion 2a are staggered about a displacement angle of 90° relative to the stops 24 at the other end of the same side portion 2a and positioned in a respective recessed portion 27. Accordingly, the connecting line between the stops 23 is perpendicular to the longitudinal axis of the side portion 2a, while the two other stops 24 are arranged on the longitudinal axis of the side portion 2a. The side portions 2, 3 have a rim 28 which encloses the recessed portion 26 whereby the outer diameter of the rim 28 is slightly smaller than the inner diameter of the circular recessed portion 27 which is engaged by the rim 28 upon assembly.

The stop insert 25, which is inserted into the respective recessed portions 26 and 27 between neighboring side portions 2 and 2a, is essentially disk-shaped. The stop insert 25 is provided with two diametrically oppositely arranged slots 29 and two diametrically oppositely arranged cutouts 30. The slots 29 have a width that corresponds to the width of the stops 23, respectively, 24 while the cutouts 30 are arc-shaped and determine the pivot angle of neighboring chain members 1. The cutouts 30 have a respective first and second abutment surface 31a, 31b, the respective abutment surfaces 31a and 31b being diametrically oppositely arranged relative to one another at the stop insert 25. In the embodiment represented in the drawings, the first abutment surface 31a is staggered at a staggering angle of 90° in the mathematically positive direction relative to the adjacent slot 29. The angle between the abutment surfaces 31a and 31b in the represented embodiment is approximately 60°.

The stop inserts 25 have a central bore 32 through which respective pegs 33 arranged within the recessed portions 26, 27 penetrate. The side portions 2, 2a of neighboring chain members 1 are connected via connecting elements 34 whereby the stop inserts 25 are arranged in the recessed portions 26, respectively, 27 of the side portions 2, 2a such that the slots 29 enclose the stops 24. The stops 24 are provided with a slot 35 extending in a radial direction. With this arrangement, the stop insert 25 is fixedly connected within the side portions 2 and the stops 23 of the side portion 2a are guided within the diametrically oppositely arranged cutouts 30 of the stop insert 25. The relative pivoting angle between the chain members 1 is thus limited by the abutment surfaces 31a and 31b, the chain members being represented only by a respective side portion 2, 2a. Due to the arrangement of the abutment surface 31a at a right angle to the slots 29 and the special embodiment of the cutout 30, the neighboring chain members 1 may be pivoted from their stretched position in only one direction about an angle that corresponds to the angle delimited by the abutment surfaces of the cutout 30. In order to change the pivoting direction of the chain members 1 relative to one another, it is now only necessary to insert the stop insert 25, rotated 180° about its axis x or y, into the recessed portion 26, 27.

For displaying the pivoting direction and the pivoting angle, the stop inserts 25 which are comprised of a plastic material are provided with markings 36 which are visible through respective openings 37 within the side portions 2, 3, 2a.

FIG. 2 represents a chain member 1 in which the transverse elements 4 and 5 are fastened to the side portions 2 and 3 such that the grooves 14 of the transverse elements 4 and 5 are facing the energy line channel. The separating cross-piece 16 is provided with two elastically deformable legs 38 with undercuts 38a at the upper and lower end which form the holder 17 and enclose transverse elements 4 and 5 having a flattened cross-section. Between the legs 38 the pins 18 are provided on the separating cross-piece 16, spaced at a same distance from the legs 38. Furthermore, it may be taken from FIG. 2 that the pins 18 have a length which corresponds to the depth of the groove 14 so that the pins 18 do not extend into the bores 15 provided at the groove 14. Accordingly, the separating cross-piece 16 is slidable in the longitudinal direction of the transverse elements 4, 5.

FIG. 4 shows a chain member 1 which essentially corresponds to the one represented in FIG. 2. However, the transverse elements 4, 5 are connected to the side portions 2, 3 such that the grooves 14 of the transverse elements 4, 5 are oriented in an outward direction. It is obvious from FIG. 5 and as well from FIG. 4 that in this chain member 1 the separating cross-piece 16 is fixed with its pins 18 in the bores 15 of the transverse elements 4 and 5, so that the separating cross-piece 16 is fixedly to the transverse elements 4,5 and is unslidable, in the longitudinal direction of the transverse elements 4, 5.

The present invention is, of course, in no way restricted to the specific disclosure of the specification and drawings, but also encompasses any modifications within the scope of the appended claims.

What we claim is:

1. A guide chain for guiding energy lines from a stationary connection to a movable consuming device, said guide chain comprising:
   a plurality of chain members being pivotably connected with one another, each one of said chain members being comprised of:
   two side portions arranged at a distance parallel to one another;
   two transverse elements connected to said side portions each one of said transverse elements having a longitudinal groove and a plurality of bores extending from a bottom of said groove through said transverse element; and
   at least one separating cross-piece arranged between said transverse elements, said separating cross-piece, at ends thereof facing said transverse elements, having a holder with at least one pin of a length corresponding to a depth of said groove, with said transverse elements in a first arrangement connected to said side portions such that said grooves face said separating cross-piece and said pins engage said grooves, and in a second arrangement connected to said side portions such that said grooves face away from said cross-piece and said pins engage said bores.

2. A guide chain according to claim 1, wherein said transverse elements have a flattened cross-section over an entire length thereof.

3. A guide chain according to claim 1, wherein said holder is U-shaped and has undercuts for receiving said transverse elements.

4. A guide chain according to claim 3, wherein said U-shaped holder has two legs being elastically deformable transverse to a longitudinal direction of said transverse elements, said pin being arranged at a same distance relative to said legs at a bottom of said U-shaped holder.

* * * * *